(12) United States Patent
Relan et al.

(10) Patent No.: US 7,872,688 B2
(45) Date of Patent: Jan. 18, 2011

(54) SELECTIVELY APPLYING SPOTLIGHT AND OTHER EFFECTS USING VIDEO LAYERING

(75) Inventors: Sandeep Kumar Relan, Bangalore (IN); Brajabandhu Mishra, Orissa (IN); Rajendra Kumar Khare, Bangalore (IN)

(73) Assignee: Broadcom Corporation, Irvine, CA (US)

( * ) Notice: Subject to any disclaimer, the term of this patent is extended or adjusted under 35 U.S.C. 154(b) by 1247 days.

(21) Appl. No.: 11/403,883

(22) Filed: Apr. 14, 2006

(65) Prior Publication Data

US 2007/0120873 A1 May 31, 2007

Related U.S. Application Data

(60) Provisional application No. 60/740,652, filed on Nov. 30, 2005.

(51) Int. Cl.
*H04N 9/74* (2006.01)
*H04N 9/76* (2006.01)

(52) U.S. Cl. .................. 348/584; 348/578; 348/598; 348/591

(58) Field of Classification Search .................. 348/584, 348/578, 598, 722, 591; 345/630, 634
See application file for complete search history.

(56) References Cited

U.S. PATENT DOCUMENTS 6,020,931 A * 2/2000 Bilbrey et al. ............... 348/584

* cited by examiner

*Primary Examiner*—David L Ometz
*Assistant Examiner*—Jean W Désir
(74) *Attorney, Agent, or Firm*—McAndrews, Held & Malloy, Ltd.

(57) ABSTRACT

A video layer effects processing system which receives normal video and special effects information on separate layers has been presented. The system selectively mixes various video layers to transmit a composite video signal for a video display such as a television, or a virtual reality system. Special effects include spotlights, zooming, etc. Additional special effects such as shaping of objects and ghost effects are created by masking and superimposing selected video layers. The selective mixing, for example, to enable or disable, strengthen or weaken, or otherwise arrange special effects, can be directed from a remote source or locally by a user through real-time control or prior setup. The video layer effects processing system can also be incorporated into a set-top-box or a local consumer box.

6 Claims, 11 Drawing Sheets

| 1115 | 1120 | 1125 |
| --- | --- | --- |
| 1 | 03220610 | 03220714 |
| 1 | 03220714 | 03221830 |
| 2 | 03221830 | 03222130 |
| 3 | 03222130 | 03230615 |
| ... | ... | ... |
| 2 | 03231800 | 03231830 |

FIGURE 11

SELECTIVELY APPLYING SPOTLIGHT AND OTHER EFFECTS USING VIDEO LAYERING

BACKGROUND OF THE INVENTION

1. Field of the Invention

This invention generally relates to video processing and communication systems, and, more particularly, to processing of video in a layered video processing and playback system.

2. Description of the Related Art

Video equipment broadcasts television programs in video streams for playback on a television. Often, there is a lot of action captured in the video that is broadcast and a user has trouble following the actions. Sometimes, a user misses the main activity due to other video movements that might be distracting to a user.

Video layers are broadcast in motion pictures expert group (MPEG 4) encoders. Different objects and the background in a scene are segmented to create different video layers. The background, however, is not full since there is no way to recreate that part of the background, which the objects occupied before in a video sequence. Therefore, the user cannot move the objects to new positions in a scene, if he wants to create new effects.

Spotlights are used widely in theaters, movie shooting, ballet programs, etc. With few exceptions, special effects are presently created off-line using software designed for that purpose.

Video editing of a program and introduction of special effects are time consuming and not capable of being applied in real time.

BRIEF DESCRIPTION OF THE DRAWINGS

FIG. 11 is a block diagram of an exemplary user log for storing usage information.

DETAILED DESCRIPTION OF THE PREFERRED EMBODIMENTS

The present invention relates to a video layer effects processing system using which a number of special effects can be produced in addition to special effects such as spot light effects received at its input. Although the following discusses aspects of the invention in terms of a video layer processing application and display system, it should be clear that the following also applies to other systems such as live television broadcast, virtual reality systems, etc.

Figure 1:
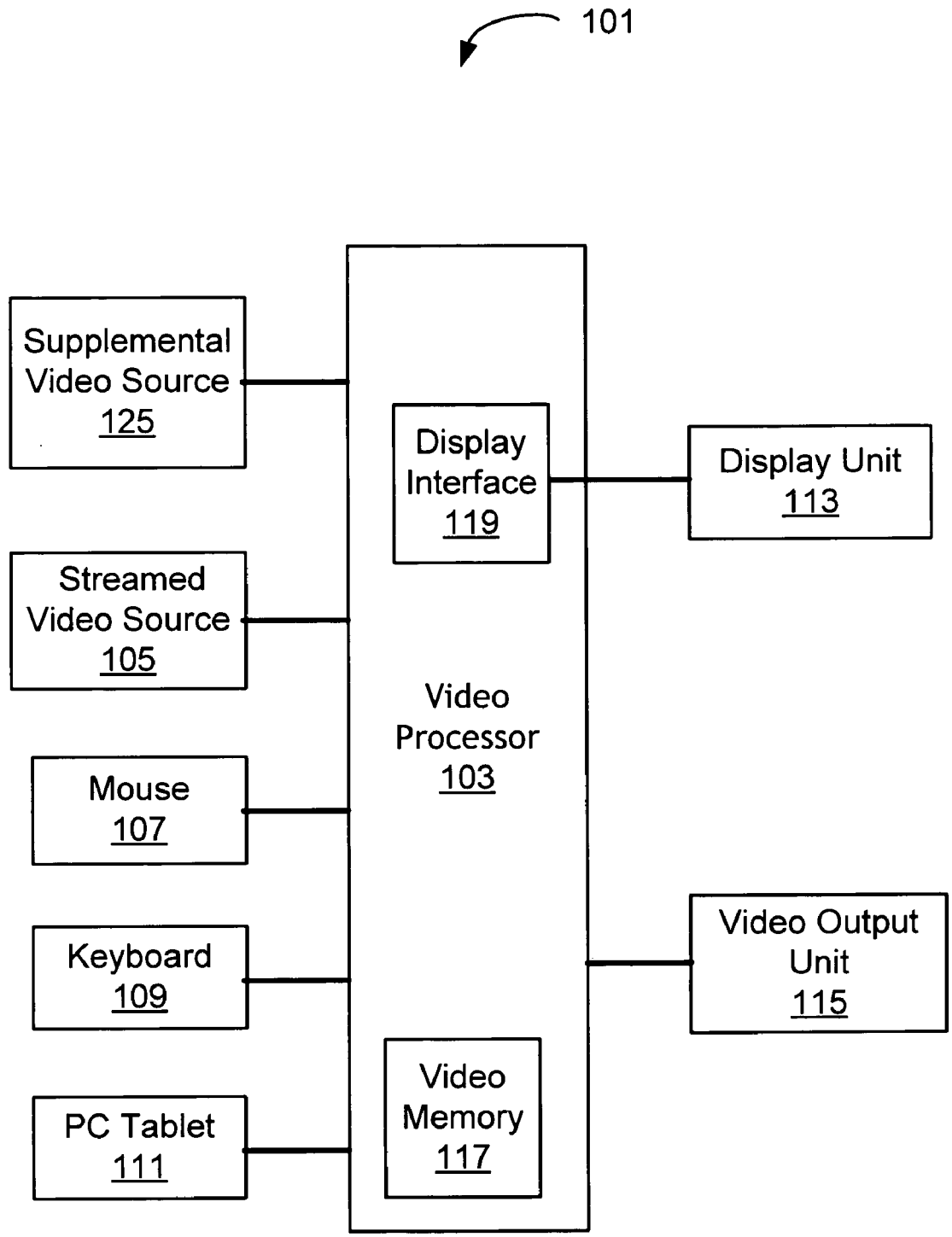
FIG. 1 is a functional block diagram of a video processing system that supports layered video effects, in accordance with the present invention.

FIG. 1 is a functional block diagram of a video processing system 101 that supports layered video effects, in accordance with an exemplary embodiment of the present invention. The video processing system 101 supports processing and display of both layered and non-layered video data. The video processing system 101 receives special effects such as spot light effects in a single or multiple video layers and mixes these layers, as per user specified configuration, into a composite video signal for display and transmission of special effects. The system also generates additional special effects, such as, under user selection.

The video processing system 101 includes a video processor 103, a streamed video source 105 that provides layered and non-layered video data, a display unit 113 that is used to display video outputs with and without video effects, and a video output unit 115 that is used to store or communicate video outputs. In addition, the video processing system 101 includes a mouse 107 for manipulating video output and for selecting video layers for display or for deletion, a keyboard used to gather user inputs for video source selections, video layer selections, special effects, etc., and a PC tablet 111 that is used to select and subsequently enhance or manipulate user selections, such as by resizing, causing special effects, etc. The video processor 103 includes a display interface 119 for interacting with display unit 113 and a video memory 117.

The streamed video source 105 provides video data in layers with various special effects such as the spot light effects, zoom effects, etc. and a background scene to a video processor 103. The video processor is capable of determining layer effects, if any, in the video inputs provided. It is also capable of incorporating user selected special effects onto an input video stream. The system 101 also delivers supplemental special effects using a local supplemental video source 125, such supplemental video data typically provided in one or more video layers. In one embodiment, each of these video layers is stored in separate memory sections or memory layers in the video memory 117 embedded in the video processor 103. The video data stored in these memory layers are selectively mixed by the video processor 103 to generate a composite video signal for display on the display unit 113 and for selective onward broadcast or storage using video output unit 115.

The selective mixing of these layers from the streamed video source 105 and/or the supplemental video source 125 is performed by the user using any of the input devices: the mouse 107, the keyboard 109 or the PC tablet 111. The user may also employ more than one of these input devices 107, 109 and 111. The transmitted data through video output unit 115 could be either the processed composite video or the unprocessed layered data received at the streamed video source 105, as per user selection. The video processing system 111 can also receive a normal video sequence in separate layers without any special effects. It can also receive non-layered video inputs. Certain special effects like object disappearing, ghost effect etc. can be rendered using the video processing system 101 even for the normal video sequence, wherein the video processor 103 facilitates user selection of a special effect and manipulates one or more layers of video data to create the special effects.

Owing to the layered nature of video inputs that are manipulated by the video processor 103, a number of extra special effects can be produced, such as dramatic or instantaneous appearance or disappearance of objects, ghost effect, etc., in addition to the special effects such as spot light effects that are received as video data to the video processing system. For example, these extra special effects can be produced in the studio during live performances or at the time of off-line editing of the video stream that is subsequently broadcast.

The ability to manipulate layered video by the video processor 103 offers a high degree of flexibility in introducing a number of special effects. Use of the 'layer concept' can be understood by an illustration. In a video of car race, the racing track may form the background and the car may constitute the foreground. These two, namely the track and the car can be received as two different layers by the video processor 103. It can then apply spot light effects or other effects differentially between these two layers, as per user or system preferences and selections. A user may prefer, for example, to present the car in high contrast and the other parts of the scene in low contrast. That is, different lighting effects are to be applied to different layers of video input. The video processor 103 supports that.

In another exemplary illustration, there are two cars competing with each other in a video sequence provided by the streamed video source 105 and the two cars are separately available in two layers. In one of the two cars, the user may introduce a zoom effect on the driver, assuming that the video data of the car as well as the driver are received in different layers, thereby creating the possibility of introducing (or providing for) more special effects. Further, for example, a red filter can be applied to one of the racing cars in one layer and green filter to another car in another layer so as to distinguish between the two cars readily, since the racing cars all tend to look alike. Thus in this invention, by receiving a plurality of layers, and being able to manipulate the different layers differently, greater flexibility is realized in combining these layers and associated special effects, or to create additional special effects.

In one embodiment, the effects and the layers are predefined, so also the layers. In addition, any effect can be received through a number of layers and combined to make a composite video for display on the display unit 113 or broadcast via the video output unit 115.

A user can switch on or off any layer and assign priority for each of the video layers in the input(s) so that objects in higher priority layers can mask or hide objects in other lower priority layers. By switching on or off and changing priorities for each layer, it is possible to create a number of special effects in addition to inherent effects, such as the spot light effect that arrives ready made at the streamed video source 105. Again, by masking, we can bring an object in a high priority layer to full view and at the same time blocking the view of objects fully or partially lying on lower priority layers. The priority of layers can also be changed by the user at will.

The user can also offset the pixel address locations received for any object in a video layer, positively or negatively in the horizontal or vertical directions, resulting in the change of the object positions. This means that the user can show even a losing car as the winner in a car race, for example. Cars or any objects in an input video data scene can be made to disappear or appear suddenly, or slowly by switching the appropriate layer(s) off or on. Repeated on, off switching can create a 'strobe' effect.

A ghost effect can also be created in the video processing system 101. This is accomplished by changing the mode of a video layer from 'mask' to 'superimpose'. This mode makes an object visible by penetrating all other layers even if the layer is a low priority layer. The user, as desired, can also change the intensity of the layer. This superimposition effect can be applied to any number of layers as in the masking effect considered earlier.

The video processor 103 can be a cable service provider receiving video streams 105 from a satellite or a broadcast TV video, which delivers non-layered (or single layered) video combination or a client video system such as a set-top-box that combines layered video effects and delivers the same to a non-layer aware television communicatively coupled downstream to the video output unit 115. The video processing system 101 can deliver supplemental special effects using a local supplemental video source 125. For instance, a stock quote on a separate video layer, delivered independent of the streamed video source 105, can be combined for display and transmission on the client video system 103 located at a user's premises. The supplemental video source 125 can also be a computer generated video stream such as those produced by game software. The video processor 103 may be a broadcast source in one embodiment. It can also be a unicast source such as a video on demand system, located entirely remotely, or located within the client (user's) premises.

In another exemplary embodiment, the streamed video source 105 is a cable TV head-end that broadcasts multiple channels to user premises equipment such as a set-top-box 103 that embodies the video processor 103. The display unit 113 is a TV that is capable of displaying the mixed outputs provided by the display interface 119 of the set-top-box 103. In addition, the video output unit 115 is a DVD read/write unit capable of storing /writing mixed video outputs generated by the set-top-box 103.

Figure 2:
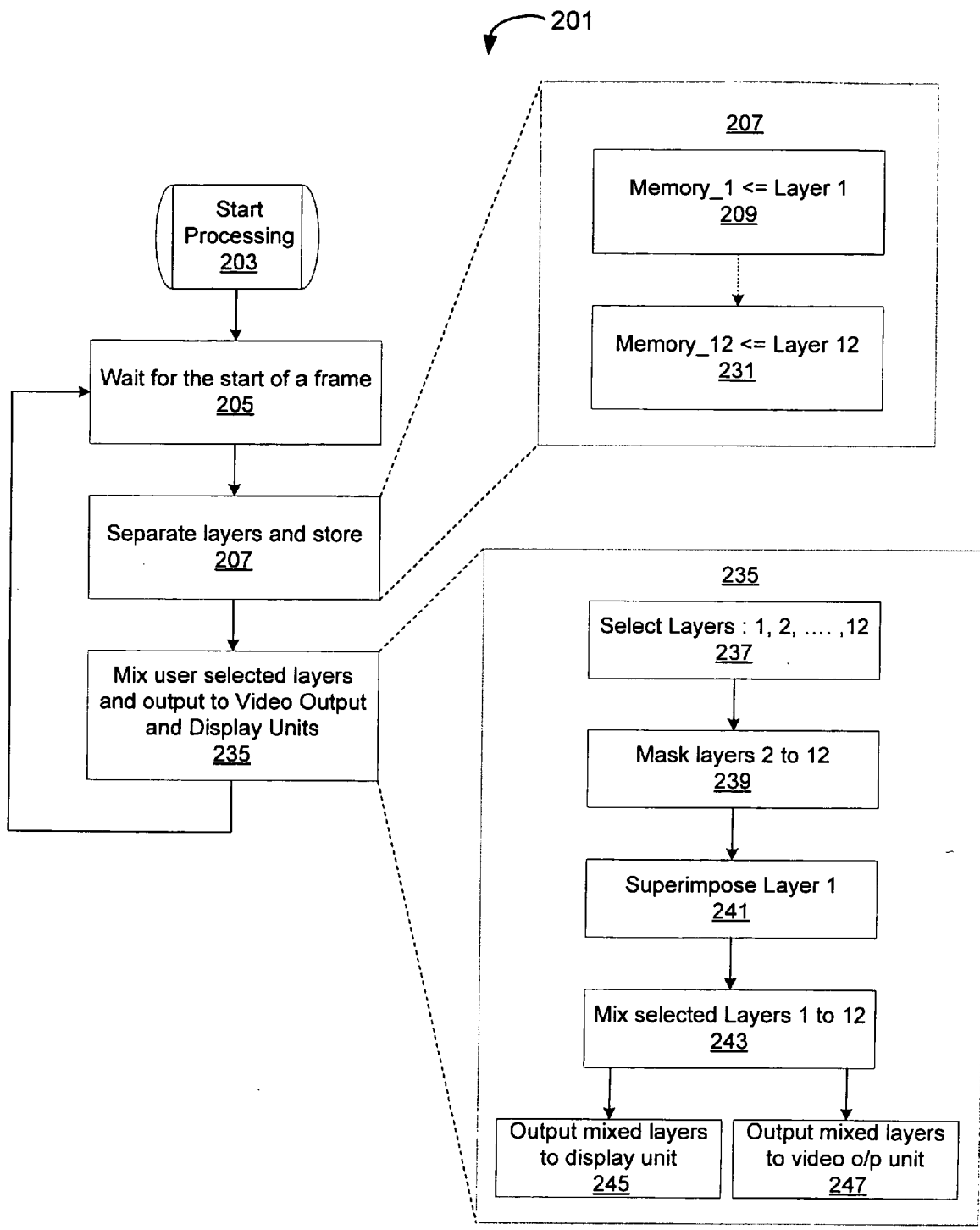
FIG. 2 shows the processing of video data and their flow through the video processing system that is capable of processing layer effects.

FIG. 2 shows the processing of video data and their flow through the video processing system 101 that is capable of processing layer effects. When the video processing system 101 is powered on, or when it comes on-line to receive the streaming video 105, then the video processing operations start at step 203. The video processing system 101 waits for the frame start signal at step 205, such a frame start signal that is embedded in the received video data input at the streamed video source 105. When it is received, at step 207, the video processing system 101 collects and separates the in-coming video data in layers and stores the separated video layer data into separate memories, or into separate sections of a memory. Each object that can be individually manipulated or embellished, and in addition, a background scene without any of the objects, are received in separate video layers at the input source 105. The background scene is one on which the objects with their associated special effects are to be applied in accordance with the present invention. These objects and the background scene can all be moving (in motion) or still pictures.

The separated video layer data are subsequently mixed in various combinations at step 235 in order to produce a number of special effects, such as the spot light effects, zoom effects, object disappearing/appearing effects, ghost effects, etc. The processed data, with or without special effects mentioned earlier, are selectively output to a local display unit 113 as well as to the video output unit 115. The processing terminates at the end of the video input, or under the control of a user via the input devices.

It is important to note that the video input arrives as pixel information, one pixel at a time. In one embodiment of the invention, a layer of video data consists of a group of pixel data along with their specific locations in a frame of a motion picture. A video frame contains a picture scene with many objects and persons. Each of these objects and persons arrive, at the streamed video source 105 of FIG. 1, as one object or a person per layer. Video layers such as Layer 1, Layer 2, Layer 12, etc. received in the video input are each identified by a unique number and stored in a designated memory locations, Memory_1 209, Memory_2 211, Memory_12 231, etc. depending upon the number of layers that is present in a video frame. The separated layers can be mixed or combined to produce a number of special effects. User can assign priority for each of the layers so that objects in higher priority layers can mask or hide objects in other lower priority layers.

The activities associated with the separation of video layers at step 207 are shown in additional detail in FIG. 2, in steps 209 and 231. The processing of block 207 includes of processing individual layers in separate sections of a memory, wherein the separate sections are designated as Memory_1, Memory_2, etc. Thus, at step 209, a Layer 1 data is stored in a Memory_1 section. Then, at a next step a Layer 2 data is stored in a Memory_2 section, and so on until finally, at step 231, a Memory_12 section is used to store a Layer 12 video data.

The selection of various layers by a user and the subsequent mixing of these selected layers are conducted in step 235, the details of which are illustrated in the set of step 237 through 247. The user selected layers are processed, combined and finally output to a local display unit at step 245 or to a video output 247 as shown in detail in FIG. 2. The video layers may be combined in a wide variety of ways in order to create various special effects.

At step 237, the user's selection of up to a maximum number of layers, such as 12, are identified. For instance, Layers 1 to 12 are selected at step 237 so that they may be mixed. Then, at step 239, if the user so desires, layers 2 to 12 may be configured as masked layers. Then, at a next step, superimposition of layers occurs. For example, Layer 1 may be processed as a layer that can be superimposed with other layers in this step. Then, at a step 243, mixing occurs as per user selection or as per system pre-configuration. For example, all the pixel data in the selected layers (1 to 12 in the one exemplary scenario) are then scaled and mixed pixel-wise as defined by the user to create a special effect. Then, at step 245, these mixed layers are finally output to a local display unit to display the special effect, or, at step 247, a video output is stored, transmitted or broadcast, as necessary.

Many types or variations of special effects are possible. Each special effect can be contained in a single or multiple layers. As example of a special effect (not shown) that can be created with the present invention is an exemplary a car race with ten different cars numbered 1 to 10, each received in a separate video layer at the streamed video source 105 shown in FIG. 1 and governed by the process depicted in FIG. 2. For example, a live video programming/coverage of the car race is likely to employ several cameras. Assuming that video inputs from a camera associated or focused on car 1 is received with the highest priority to be transmitted in a video layer 1, and video from car 2 in layer 2 which is of the next priority and so on, with video from car 10 in layer 10, which is the least priority among the ten layers. Assuming also that the background scene without any of the 10 cars, namely that of the moving car tracks, is captured and provided in a video layer 11, which is of the lowest priority, which cannot mask any other layer. If masking is applied to all the layers and masking is enabled for all of them, then the mixed scene displayed or transmitted will be an integrated scene with all the racing cars and the moving back ground. Thus, the video object associated with car 1 will step all other cars and the background if the associated video objects are immediately behind car 1. Thus, car 1 may step other car(s) partially or fully depending upon their actual positions, which changes dynamically. The next layer (car 2) may similarly step the views of other cars and so on. The resulting effect in this example is a simple application of masking to all layers. In addition to the masking effect applied in this invention, any other special effect received by the input source 105 also takes immediate effect. For example, if car 1 is currently in leading position and spotlighted using spotlight effect received through layer 1, then the spot light effects for car 1 and mask effects on other cars are all effective simultaneously.

In the above example, it is possible for a viewer to change the effect as follows. Since there are too many cars in the scene, the user may like to retain just two cars in his viewed output, say, car1 and car 10 that are ahead of other cars. This can be easily accomplished by switching off other layers, 2 to 9 and retaining only layers 1, 10 and 11. Car 1 may still step the view of car 10 partially or fully if car 10 is immediately beneath, since layer 1 is assigned the top most priority. However, if the user desires to bring car 10 in full view and mask car 1, the user can re-assign top priority to layer 10, with layer 1 automatically assigned the next higher priority. Thus, by switching on or off and changing priorities for each layer, using the input devices from FIG. 1, the user can create a number of special effects in addition to inherent effect such as the spot light effect that arrives ready made at the streamed video source 105.

An user can also offset the pixel address locations for any object layer positively or negatively in the horizontal or vertical directions, resulting in changing the car positions. This means that the user can show even a losing car as the winner. Cars or any objects in a scene can be made to disappear or appear suddenly or slowly by switching the appropriate layer (s) off or on. Repeated on, off switching can create a 'strobe' effect.

Let us consider another effect in the foregoing example, in which we wish to change car 10 in layer 10 as a ghost car. This can be done easily by changing the mode of layer 10 from 'mask' to 'superimpose'. This mode makes car 10 visible by penetrating all other layers although layer 10 is a low priority layer. The user as desired can also change intensity of the layer. This superimposition effect can be applied to any number of layers as in the masking effect considered earlier.

The above effects can be applied extempore using the input devices: a mouse 107, a keyboard 109 or a PC tablet 111. These devices can also be used to input a sequence of effects desired and store it in a library in the video layer effects processor 103 for fast application of these effects when invoked. Combining all the options mentioned earlier judiciously, a wide variety of special effects could be produced.

Figure 3:
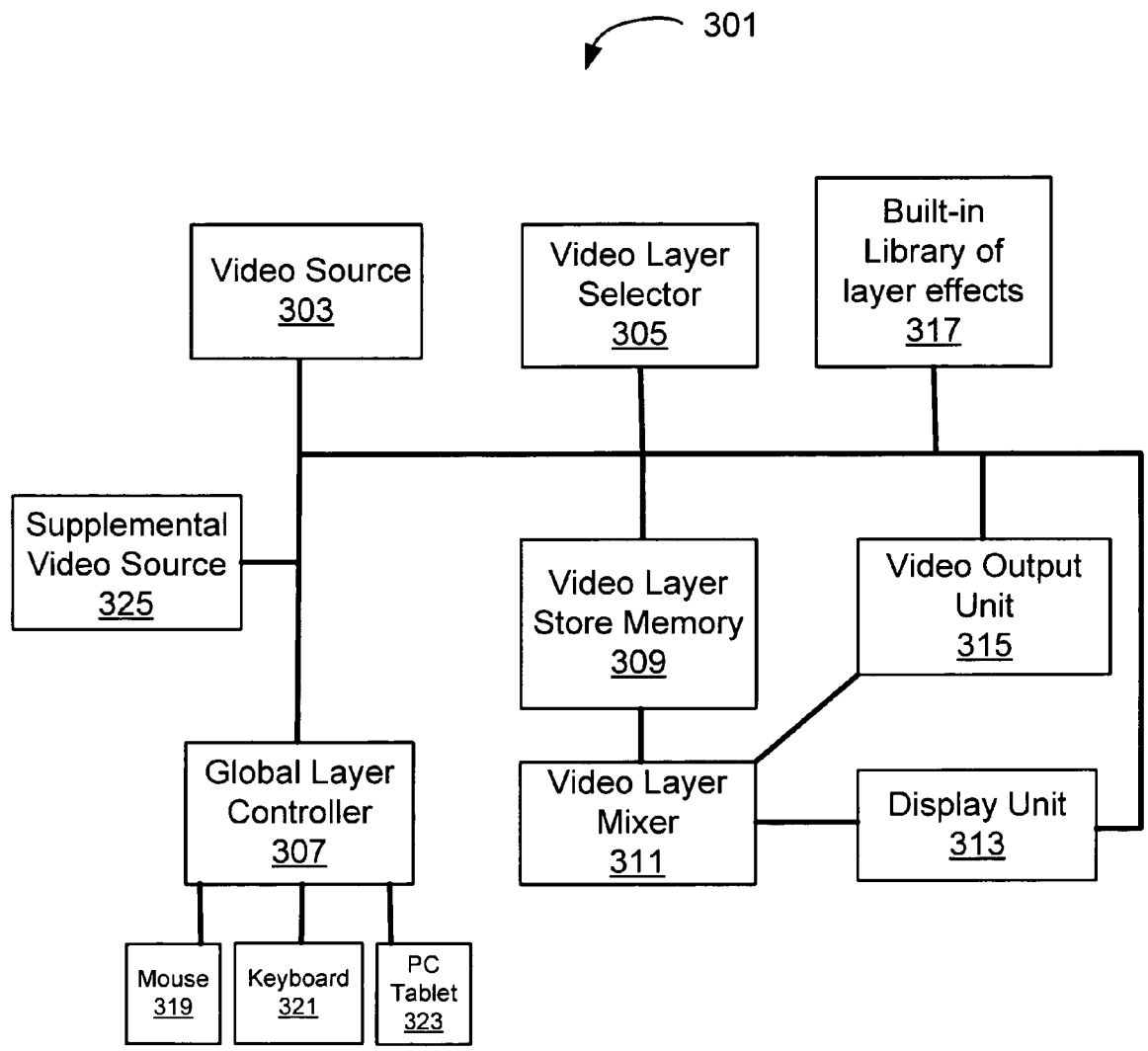
FIG. 3 is a schematic block diagram depicting another exemplary video processing system that is similar to the one described in FIG. 1.

FIG. 3 is a schematic block diagram depicting another exemplary embodiment of a video processing system 301 that is similar to the one described in FIG. 1. The video processing system 301 includes a video source 303 that provides video data in layers with various special effects such as the spot light effects, zoom effects, etc. and a supplemental video source 325, such as computer graphics, games or stock quote that can also be input as one of the video layers. Each of the special effects, in general, is distributed over several video layers, data arriving typically as pixel information. A video layer selector 305 identifies these video layers that are provided in the video source 303 or the supplemental video source 325, as they are received in real time, and stores these layers in a video layer store memory unit 309.

A global layer controller 307 accepts user inputs, such as from a mouse 319, a keyboard 321, or a PC tablet 323. It configures the video processing system 301 to create a wide variety of special effects such as spot light effects, masking effects, ghost effects etc. The global layer controller 307 is communicatively coupled to a video layer system bus and a video layer-mixing unit 311. The video layer-mixing unit 311 selectively mixes various video layers stored in the video layer store memory unit 309, with or without special effects, producing a composite video as per user request or system pre-configuration. The video layer-mixing unit 311 is communicatively coupled to the global layer controller 307, the display unit 313 and the video output unit 315. The display unit 313 is communicatively coupled to the video layer mixing unit 311 and the video layer system bus and, displays the processed composite video output. The video output unit 315 is communicatively coupled to the video layer mixing unit 311 and the video layer system bus and outputs the composite video with or without special effects as per the user's choice.

A built-in library of special effects and extra special effects 317 can be created and displayed or output and, is communicatively coupled to the video layer system bus, the display unit 313 and the video output unit 315.

Figure 4:
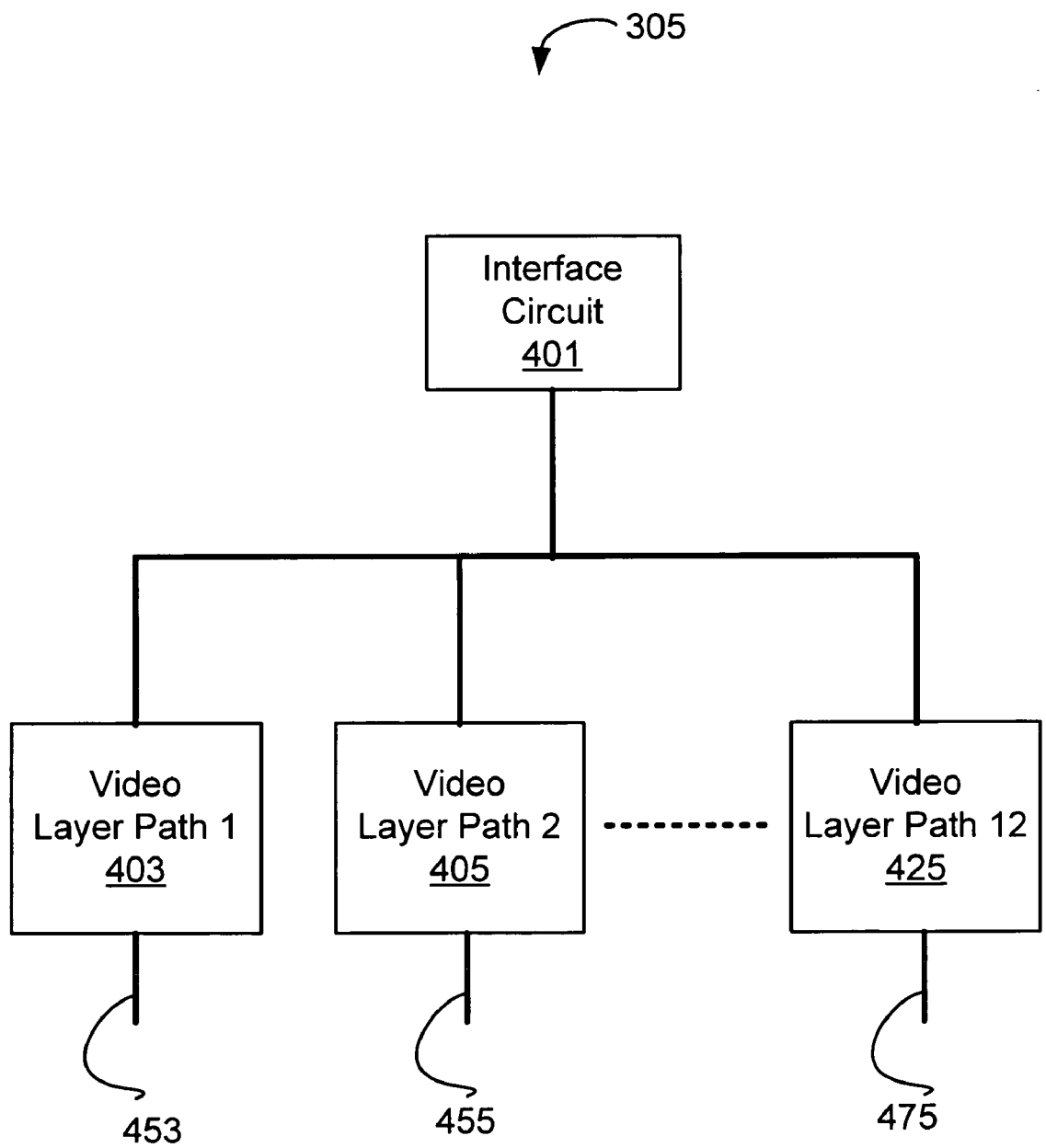
FIG. 4 is a schematic block diagram of the video layer selector of FIG. 3.

FIG. 4 is a schematic block diagram of the video layer selector 305 of FIG. 3. The video layer selector 305 includes an interface circuit 401 that is communicatively coupled to the global layer controller 307, the video source 303 and the video layer selector system bus. A number of video layer paths 403, 405 ... 425, which are communicatively coupled to a selector bus 427, routes the separated video layer data 453, 455, up to 475 to the video layer store memory units 309.

Thus, the video selector makes it possible to select one or more video layers, and the selected video layers are retrieved for storage into memory. They can subsequently be mixed, masked, deleted, etc. The video selector 305 is manipulated by a user using one of the input devices.

Figure 5:
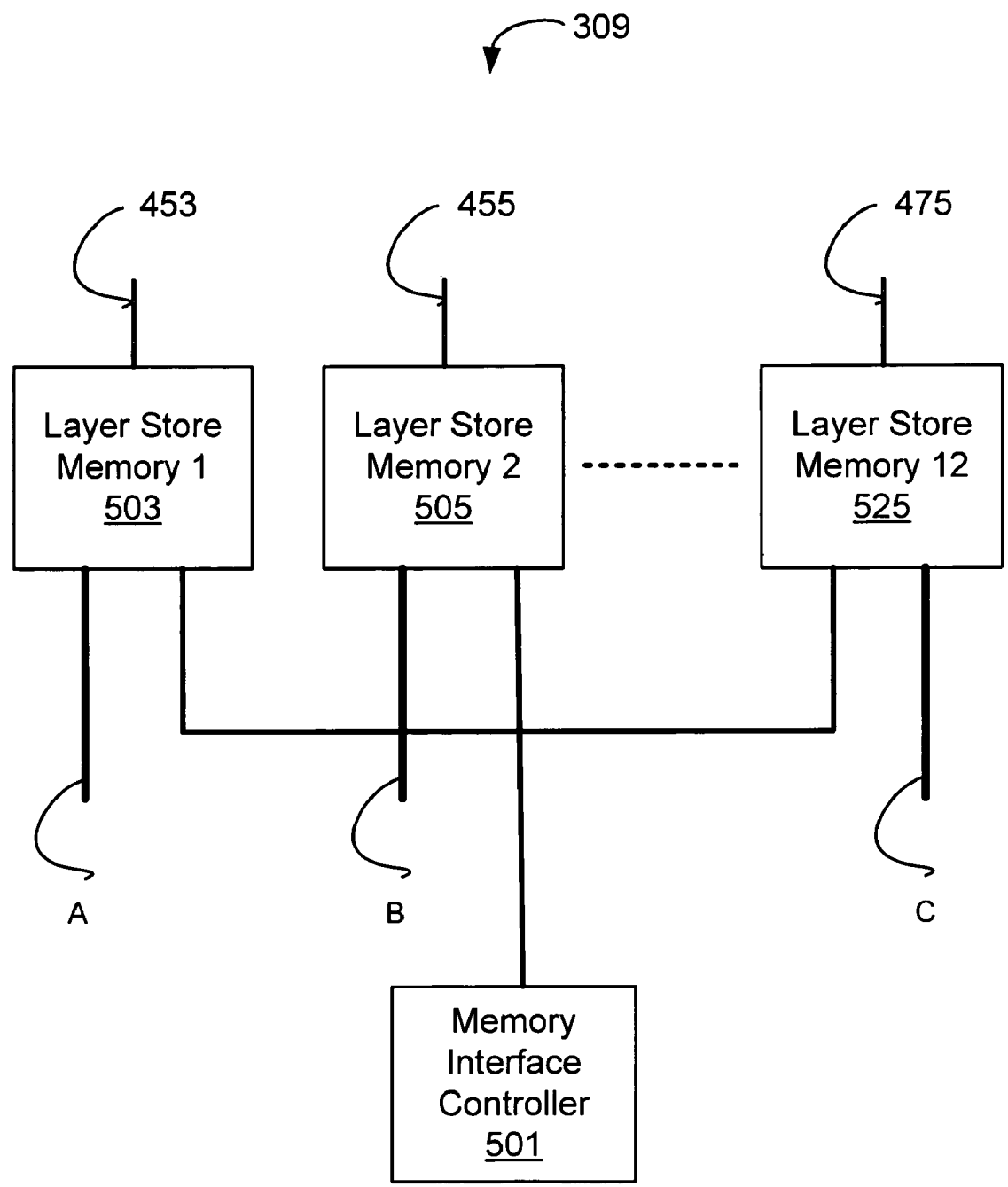
FIG. 5 is a schematic block diagram of the video layer store memory unit shown in FIG. 3.

FIG. 5 is a schematic block diagram of the video layer store memory unit 309 shown in FIG. 3. A number of video layer store memory modules, a Memory 1 503, a Memory 2 505, a Memory 12 525, etc., stores respectively a Layer 1, a Layer 2, up to a Layer 12 information, provided by a video layer selector 305. The outputs of these memory modules are communicatively coupled to the video layer mixing unit 311 (shown in FIG. 3) using a Data 1, a Data 2, a Data 12, etc. as inputs of the video layer mixing unit 311. A memory interface controller 501, which is communicatively coupled to the global layer controller 307, issues various handshake signals to and from the memory modules 503, 505, 525, etc. The video layer memory selector control bus 577 interfaces with all the memory modules 503, 505, 525, etc. and the memory interface controller 501.

The memory interface controller makes it possible to access one or more stored video layer stores 503, 505, 525. It provides dynamic control over the selection and mixing process. In one embodiment, the number of memory modules is flexible and can be configured into the video processing system. In a different embodiment, a variable number of memory modules up to a maximum number, may be configured and used for storing and manipulating video data layers.

Figure 6:
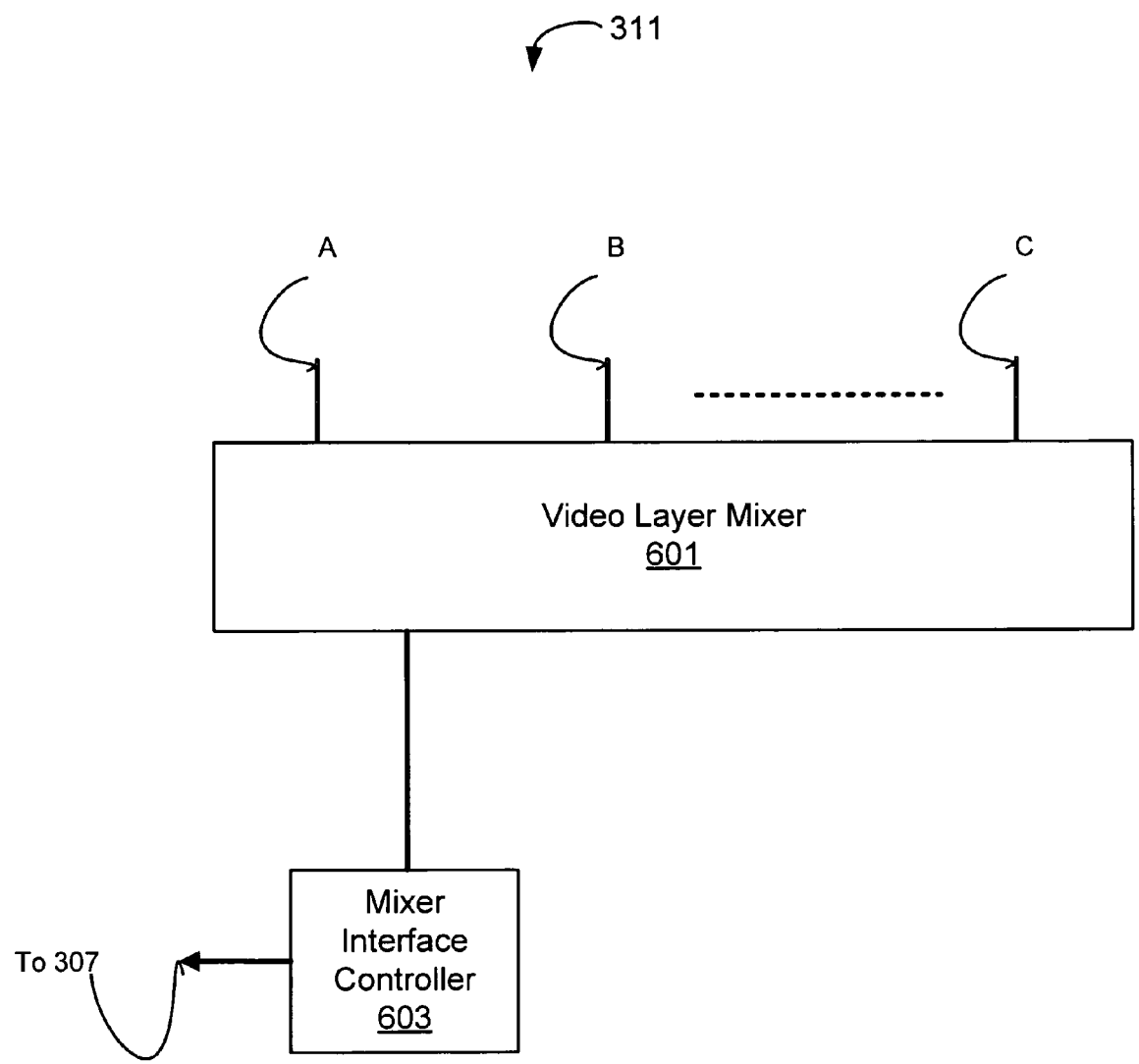
FIG. 6 is a schematic block diagram showing exemplary details of the video layer mixing unit of FIG. 3.

FIG. 6 is a schematic block diagram showing exemplary details of the video layer mixing unit 311 of FIG. 3. The video layer mixing unit 311 includes a video layer mixer 601 that receives various video data, a Data 1, a Data 2, etc. from the video layer store memory unit 309 shown in FIG. 5. The video layer unit 311 includes a mixer interface controller 603 that is communicatively coupled to the video layer mixer 601 and the global layer controller 307 shown in FIG. 3. The video layer mixer 601 combines various layer data selected by the user and outputs a combined video data, selectively serving as outputs for the display unit 313 and the video output unit 315.

The video layer mixer 601 mixes layers that are selected by a user onto a background layer. The video layer mixer 601 can dynamically add layers, drop layers, highlight layers, etc. based on user selection of layers and user specifications on the special effects to be conducted on specific layers. It can provide spotlight effects on specific layers, resize some of the layers before mixing, highlight selected layers for better contrast, etc.

Figure 7:
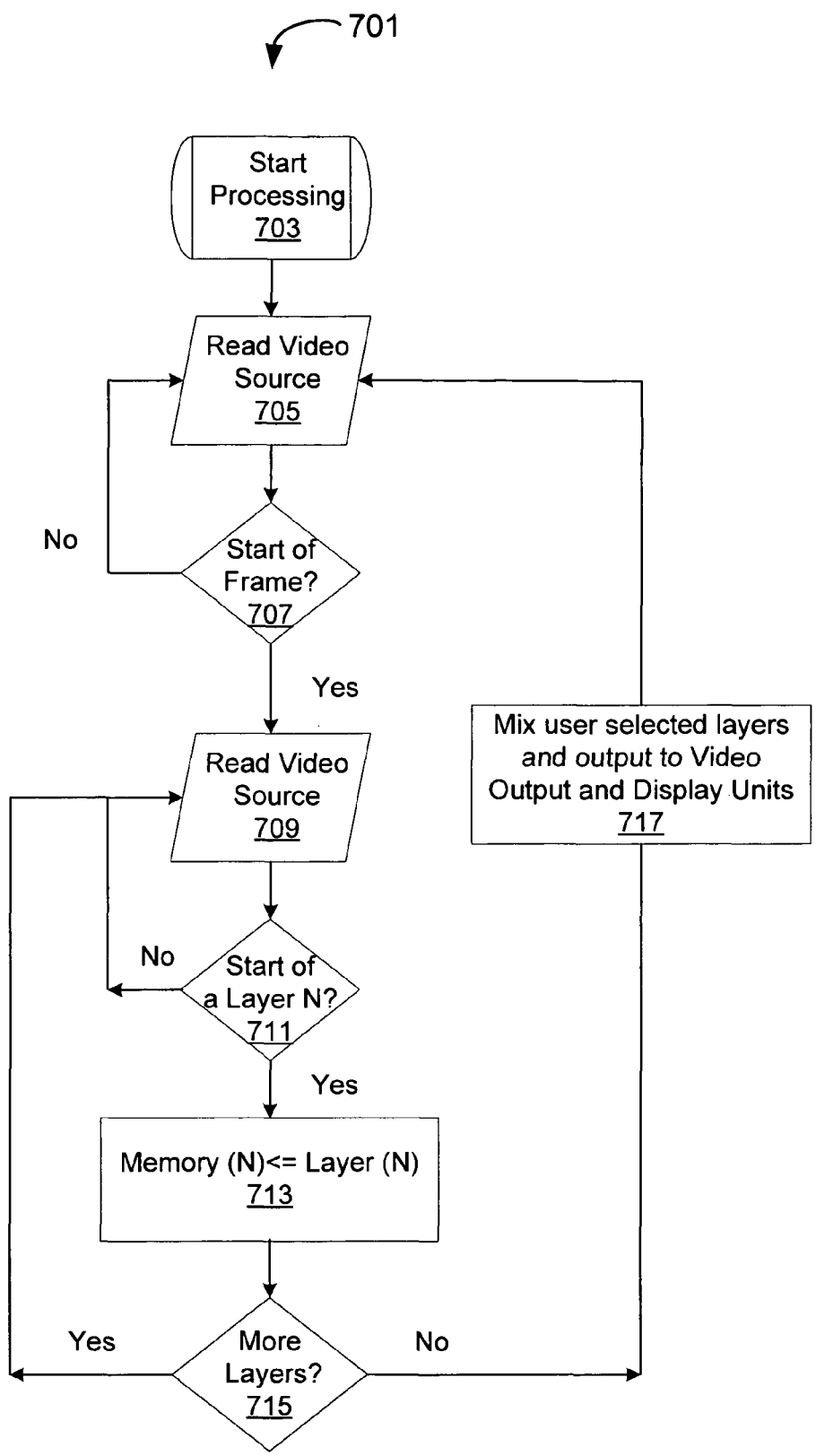
FIG. 7 is a flow chart that shows an exemplary method of acquiring video effects data provided in layers from a streamed video source input by the video processing system of FIG. 1, in accordance with one embodiment of the present invention.

FIG. 7 is a flow chart that shows an exemplary method 701 of acquiring video effects data provided in layers from a streamed video source input 105 by the video processing system 101 of FIG. 1, in accordance with one embodiment of the present invention. The method 701 of acquiring the layer data, with or without special effects, such as the spot light effects, and the application of special effects selectively, resulting in additional special effects, is described in this flow chart.

At start step 703, the processing commences and the incoming video stream at the video source 105 is accessed. Then, at step 705, the incoming video stream with or without special effects, is read. Then, at step 707, an attempt is made to determine if a start of frame is available. If it is determined that a start of frame code is determined not to be available, then processing returns to step 705 where the incoming stream is read again.

If the start of the frame signal is received at step 707, then, at step 709, the start of layer signal is awaited. When it is received, a check is made at step 711 to determine if the start of layer N is encountered. If it is encountered, then, at step 713, the layer N video data is stored in memory. Otherwise, the video source 105 is continued to be read at step 709, awaiting the start of the layer signal.

Video data is read as layers at step 709. When the start of the layer signal 711 is received, the video layer data, received as a subsequent burst of data, with or without special effects, is stored in memory unit at step 713. The start of the layer signal at step 711 also conveys which layer (N) is being received currently. Each video layer, consisting of an object of a scene or a background or an aspect of a special effect, is stored in a separate memory module at step 713. There can be any number of video layers in a video sequence. Each video layer data is stored in a separate memory in order to speed up mixing process subsequently. The above process starting from the start of the layer signal at step 711 is repeated if there are more layers of data as determined at step 715, such layers arriving in a current frame.

When, at step 715, it is determined that there are no more layers being presented (all layers have been received), then, at step 717, all the user-selected video layers are mixed using the video layer mixing unit 311. The generated combined output is sent to the display unit 313 or to the video output unit 315, as required, for onward transmission over a channel or a radio link.

The whole process is repeated frame after frame. The present invention is dynamic and may be applied to video sequences in real time, on-line. The method of video layer data acquisition is based on receiving header information, which is described next.

The present invention incorporates a number of header information, which enables the video processing system 101 to receive input data containing special effects or normal video sequence in layers from the video source 105. In one embodiment, the header information and data format are received as detailed in the following manner (other means are also contemplated):

1. A 'communication rate' setting expressed as mega pixels per second. This is set by a switch to match the video source 105 input pixel rate.
2. A picture size code in the horizontal and vertical directions, measured in pixels.
3. A picture format code such as R, G, B or Y, Cb, Cr or Y, U, V; 4:4:4 or 4:2:2 or 4:2:1 or 4:2:0 and a frame rate such as 30 or 25 frames/sec.
4. A code to indicate the 'start of a frame'.
5. An 'identity number' for each of the special effects present in the video data and an 'aspect identity code' of the special effect such as a circular spot light in a spot light effect, its size, color, etc.
6. A code to indicate the 'start of a layer' and layer identity number N.
7. A pixel position or address in the picture and a start of a step of data in a row.
8. Step of data in a pre-determined order.
9. An 'end of the step' indication.
10. An 'end of the layer' indication.
11. An 'end of the frame' indication.

The input video source 105 must assert 'C' in command/data signal 'C/D*' for all commands from serial numbers 2 to 11 except 8. For step data transfer in serial number 8, 'D*' must be asserted.

Figure 8:
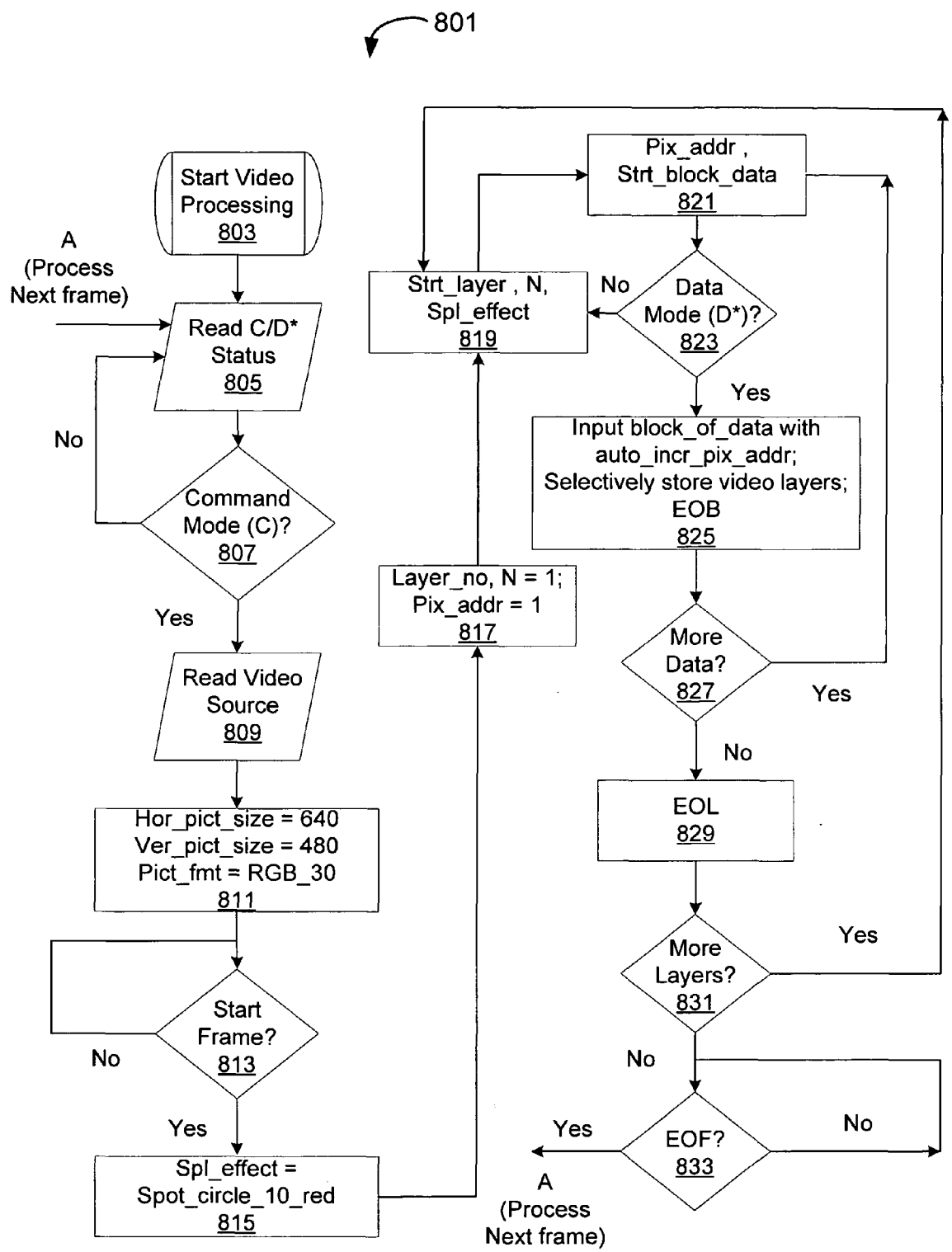
FIG. 8 shows an example of header information and data communication received from the video source by the video layer effects processing system.

FIG. 8 shows an example of header information and data communication 801 received from the video source 105 by the video layer effects processing system 101. The header information facilitates random access to the incoming video stream synchronized with the start of a frame. Thus, any user may come on-line at any point of time The video processing starts when a Start Video Processing signal is received at a step 803. This signals the commencement of data communication as shown in FIG. 8. At step 805, when C/D* Status is read, it is analyzed at the next decision step 807.

If, at step 807, the command 'C' is determined, then, at step 809, the video source is read. Otherwise, the video processing system 101 waits for the command to be asserted at step 805.

At the step 807, when a command 'C' is encountered, a picture size and format is anticipated from the input and which is read at the step 809. At step 811, the picture size and color parameters are analyzed and stored. As an example, the picture size may be 640×480 pixels in RGB format. Other picture sizes are also supported. Color formats include YCbCr or YUV in any one of the formats, 4:4:4 or 4:2:2 or 4:2:1 or 4:2:0. The frame rate is 30 frames per second although any other frame rate such as 25 can be set. Any upcoming new standard formats can be easily upgraded.

As step 813, the start of frame command is awaited. When the same is received, at step 815, the special effect identity (such as spot light effect) and its aspect (such as circular spot light of color red with a diameter of 10 units) are received. These, in turn, are followed by the reception of starting layer number and pixel address at step 817 and start by the layer command at a subsequent step 819.

Then, at step 821, after sending the start step of data command, the video source 105 sends the step of data while simultaneously asserting the data mode (D*) signal. At step 823, the data mode is analyzed. If it is determined to be appropriate, then, at a next step 825, the signal 'Pix_addr' is read, which furnishes the address of the very first data in a step of data. This is incremented automatically to point to the address of the next data. These data are stored in contiguous locations in the memory for layer 1 for selectively applying the special effects. The end of step of data is signaled by 'EOB' 825. A step of data starts and ends in a row of picture.

At step 827, an attempt is made to determine if more data is available in the input video streams. The above steps from 821 onwards are repeated for receiving all other data steps in the layer if there is more data pending 827. Then, eventually, an end of layer indication is received at step 828.

Then, at step 831, an attempt is made to determine if more layers are presented. If no more layers are presented, then at the next decision step, an End of Frame if anticipated. If one is received, the processing of video data for the next frame is conducted. Otherwise, processing loops back to step 833 receive the end of frame.

At the decision step 827, if all data in a layer are received, the end of layer 'EOL' signals the same. If there are more layers of data in a frame, as determined in step 831, the above process commencing from step 819 is repeated. Thus, if all layer data are received, the end of frame 'EOF' is signaled at step 833 and, the whole process is repeated from step 805 for the next frame after frame.

The video processing system 101 receives video data as video layers from a camera, a TV broadcast, a virtual reality system, etc., with or without special effects. The number of video layers in a video sequence depends upon the video content of the video source 105. It can be one layer per effect or multiple layers per effect. Each object in a group of pictures or an aspect of a special effect appears as a layer. For example, if there are four different persons in a scene, then there will be five layers, one person in one layer and a full background of the scene without the four persons in the fifth layer. Similarly, if there are three spotlights in a scene, each moving in a different direction, then these effects are received as three different video layers with one spotlight in one layer. On the other hand, if the above scene and the spotlights are combined, then there will be eight layers per scene or a video sequence.

The special effects include various kinds of effects such as spot light effects, zooming effects, fade in/fade out effects, multiple channel image display effects, etc.

Each of the special effects, such as the spot light effects, is received as a plurality of video layers and is identified by appropriate header information and, the video layers are selected depending upon the actual user input controls applied. The input controls can be a standard wired mouse, a wireless mouse, a remote control, a keyboard or a PC tablet and are communicatively coupled to the global layer controller 107 as shown in FIG. 1.

The special effects applied in layers in a video sequence can be selected by the user at the time of editing, broadcasting or reception by applying appropriate controls to activate these layers. As a default, all layers are configured as 'mask' layers and switched on.

The activated layers can be assigned a hierarchy of layers in an order of priority such as the top most or the highest priority layer, the second top layer and so on up to the bottom most layer. As a default, the system assigns layer 1, the very first layer received, as the top most layer, layer 2 as the next priority layer and so on up to layer N, which is assigned the lowest priority. The order of priority follows the same order mentioned earlier, even if one or more layers are switched off. The layers that are switched off are ignored and, the priority passes on to the next layer that is switched on. Priority is applicable for mask layers. These video layers can be switched on or off by the user on-line either at the broadcasting studios or at the set-top box/cable network operator at the user's end.

In one embodiment, where the priority of layers mentioned earlier is applied, the active top most layer masks or steps all other layers, the next active layer masks all other lower layers but not the top most layer and, so on. The masking of other layers by the higher priority layer(s) applies only to area(s) occupied by the object(s) in the higher priority layer(s) that are switched on, whereas no masking take place in other areas, thus revealing objects in other layers lying beneath the higher priority layers. Any layer can be assigned by the user as the top most layer or the highest priority layer and so on up to the bottom most layer. As an example, among layer 1 through layer 10 that are available in the decreasing order of priority, if layer 2 to layer 4 are switched off, then the priority of layers in descending order is layer 1, layer 5 through layer 10, assuming all the said layers are switched on.

This aspect of applying masking priority on the video layers offers an extra special effect such as the following. A scenic spot, say, the ice-capped Titlis at Switzerland being shot as a video layer (or a pre-recorded version available already in the video library) and a leading film personality enacting a scene in Hollywood studios shot as a separate video layer can be combined into a single composite video giving an impression that the actor has been enacting his role in Titlis, without the need for physical travel to the actual location of shooting. Many permutations and combinations of such extra effects can be worked out on similar lines. This results in enormous savings in expenses, especially if many actors are involved. Other uses can be in video karaoke, instantaneous manifestation or disappearance of objects or persons and, so on.

In another embodiment, any layer or a plurality of layers can be superimposed with other layers selectively by the user, a convenient feature for creation of ghost effect. Thus, combining one or more features mentioned earlier, a number of extra special effects can be conjured up such as a dramatic appearance or disappearance of objects, ghost effect, etc., in addition to the special effects such as spot light effects that are received as video data to the video layer effects processing system 101.

Figure 9:
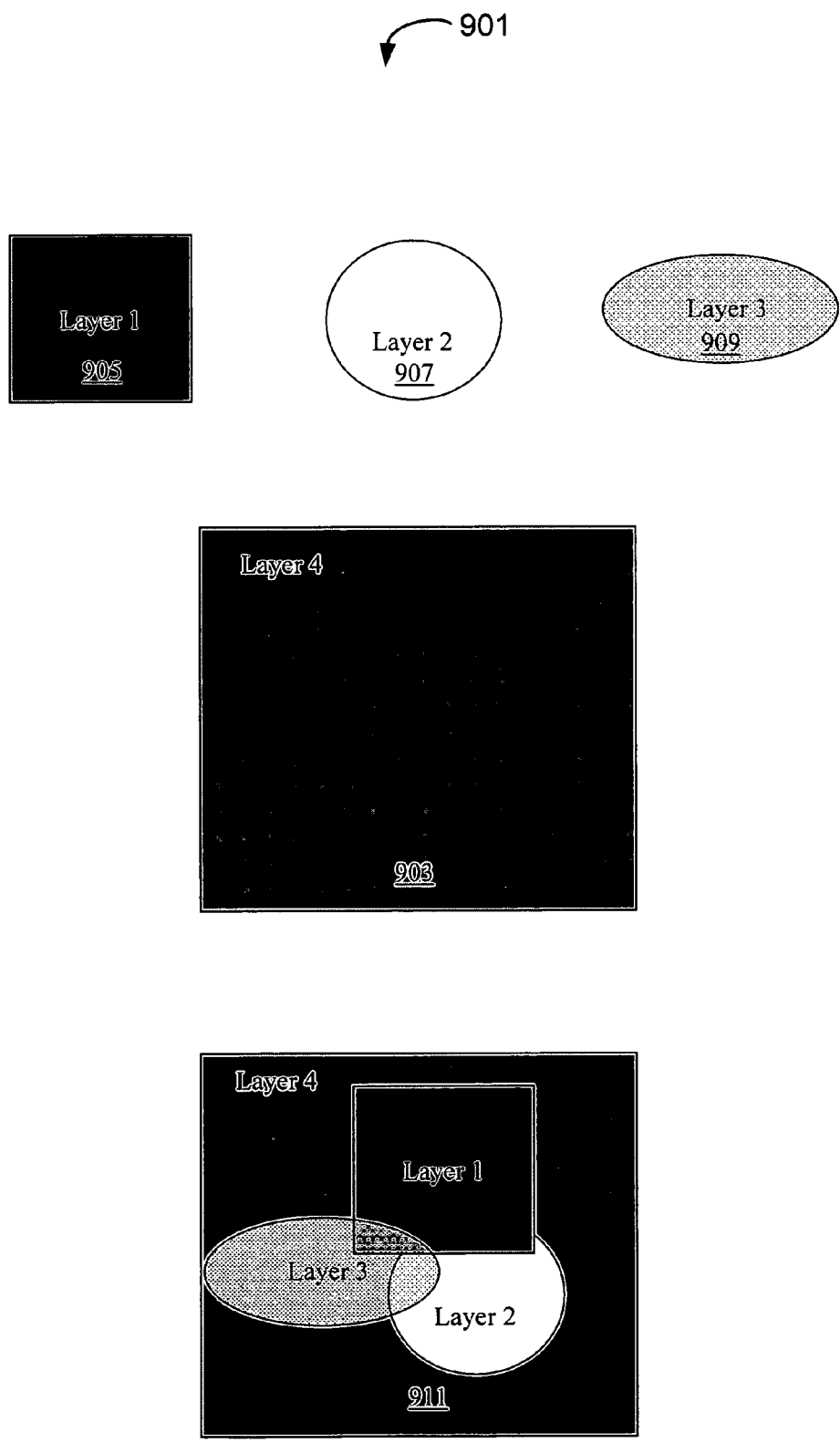
FIG. 9 illustrates the result of masking and superimposition effect when using multiple layers.

FIG. 9 illustrates the result of masking and superimposition effect when using multiple layers 901. Considering a video scene comprising three objects: a square 905, a circle 907 and an ellipse 909 and, a background 903 captured without any of these objects. These objects and the background arrive at the video source 105 as layer 1 to layer 4 respectively, one layer at a time. Layer 1 is assigned the top most priority and layer 2 the next priority and so on down to layer 4, the lowest priority. Priority applies to the layer in 'mask' mode and not to the 'superimposition' layer mode. Let us assume that Layer 1 (square object) and layer 2 (circle) are configured as 'mask' mode, whereas layer 3 (ellipse) is configured as 'superimposition' mode. The combined effect of using the invention 101 is the composite video frame shown as 911. It may be noted that square object (layer 1) is in the highest priority layer and hence steps the view of the circle (layer 2) partially. Both square and circle step the background since it has the lowest priority among the masked layers. Although the ellipse (layer 3) is the lowest priority among the objects, it is completely visible since it is configured in 'superimposition' mode. This mode can thus be used for a ghost effect since no other objects can step its view.

The sequence of extra special effects and other special effects such as spot light effects described earlier can be stored in a built-in library, with a provision to add more number of such effects by the user, thus enabling the user to apply a variety of special effects on-line in new scenarios.

Figure 10:
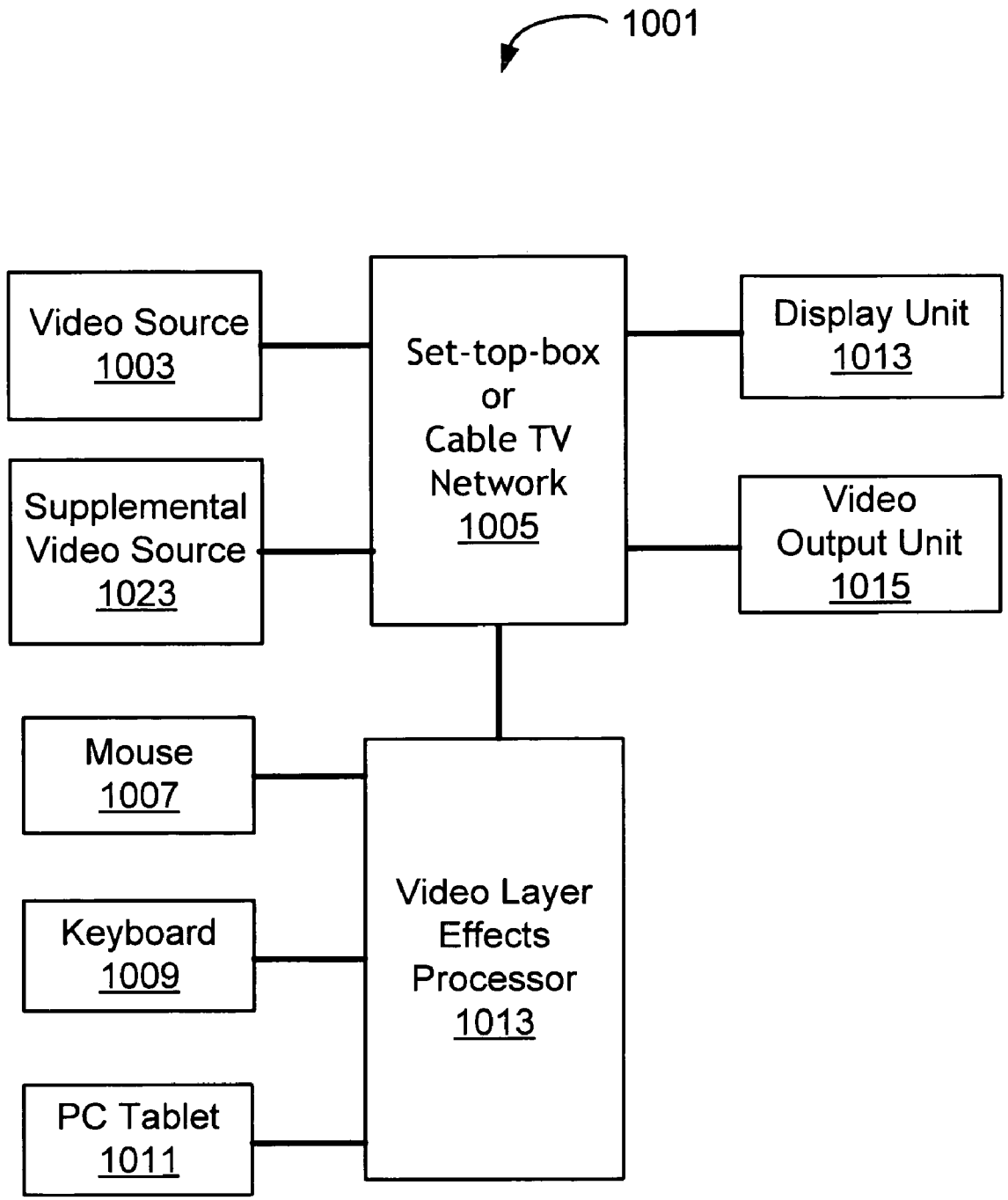
FIG. 10 is a schematic block diagram of a the video processing system incorporated into a set-top-box or a local consumer box provided by a cable TV network operator allowing the cable operator to apply all the special effects.

FIG. 10 is a schematic block diagram of a the video processing system 1001 incorporated into a set-top-box or a local consumer box provided by a cable TV network operator allowing the cable operator to apply all the special effects. The cable operator can provide the extra special effects or switch off these effects as required. A video source 1003 provides data which can be either unprocessed, layered video received or the processed composite video signals with special effects. The system 1001 can also deliver supplemental special effects using a local supplemental video source 1023 in video layers. If the received video data is the unprocessed, layered signal, then the cable TV network operator 1005 has the flexibility of applying the special effects locally using input devices, mouse 1007, keyboard 1009 and PC tablet 1011 connected to the video layer effects processor 1013 in the video layer effects processing system 1001 at the cable TV network 1005. A Display unit 1013 and a video output unit 1015 are connected to the cable TV network 1005. On the other hand, if the received video data is the processed composite video signals with special effects, then it is directly sent as a non-layered video over the cable to users though the video output unit 1015. In this case, the cable operator can still apply the local special effects using the supplemental video source 1023.

According to another embodiment of the invention, the system will monitor use of the special effect and charge the user accordingly. According to an exemplary embodiment of the present invention, the use is monitored by use-based metering which will monitor the use of the spotlight effect. The metering is performed by a user meter which will monitor for example, how the special effect is used. Monitoring of the special effect allows the service provider to charge an end-user based upon how the special effect is used, and for how long the special effect is used.

In an exemplary embodiment, the use meter will detect the request for a special effect, monitor the type of special effect used, and the time that the special effect was in use by the end user. The time that the effect is in use may begin either when the special effect is transmitted, or in the case where the special effect is continuously transmitted, the time that the special effect is in use.

According to another exemplary embodiment, a use server is provided to implement the use meter. For example, a set top box (STB), as shown in FIG. 1 is configured, either by hardware or software, to monitor use of the special effect and to transmit a use report to the use server. The information stored in the user server, allows for appropriate or customized billing for use of the special effect.

According to this exemplary embodiment, the stored usage information is in the form of a user log as shown in FIG. 11. Thus, the user log 1100 represents use of the special effect by a particular end-user. The user log 1100 is configurable to correspond to a single STB or to multiple STB for a particular user.

The user log 1100 entries may include for example, the type of special effect that was used, the time that use of the special effect began and the time that use of the special effect ended for the end-user. As shown in the example illustrated in FIG. 11, column 1 1115 contains an indication of the special effect that was used. A "1" for example indicates that a spotlight effect was used.

Column 2 1120 contains an entry for the date and time use of the special effect began. For example "03220610" indicates that use of the special effect began on March 22 at 6:10 a.m.

Likewise, column 3 1125 contains an entry for the date and time that use of the special effect ended. Thus, "03220714" indicates that use of the special effect ended on March 22 at 7:14 a.m.

While the present invention has been described with reference to certain embodiments, it will be understood by those skilled in the art that various changes may be made and equivalents may be substituted without departing from the scope of the present invention. In addition, many modifications may be made to adapt a particular situation or material to the features of the present invention without departing from its scope. Therefore, it is intended that the present invention is not limited to the particular embodiment disclosed, but that the present invention will include all embodiments falling within the scope of the detailed descriptions and the appended claims.

We claim:

1. A method of processing video layer effects in a video processing system, the method comprising:
   providing a video data in layers with various special effects by a video source or by a supplemental video source;
   identifying receipt of a plurality of video layers in the video data by a video layer selector;
   storing the plurality of video layers by the video selector;
   facilitating the selection of at least one of the plurality of video layers by a user;
   mixing, by a video layer mixing unit, at least one of the plurality of video layers selected by a user with at least one of the others of the plurality of video layers to generate a composite output; and
   recording, in a memory, the selection of the at least one of the plurality of video layers by the user, and the duration of said selection.

2. A method of claim 1, wherein the providing step comprises: accessing a first video data in layers with various special effects from the video source; and retrieving a second video data in layers with various special effects from the supplemental video source.

3. The method of claim 2, wherein the facilitating step comprises: presenting, to a user via an input selection means, the list of video layers from the first video data in layers and the second video data in layers; and soliciting user selection of a selected list of layers via the input selection means.

4. The method of claim 3 wherein the mixing step further comprises: extracting, by the video layer mixing unit, a background layer from the first video data in layers; and combining, by the video layer mixing unit, the selected list of layers with an user selected additional special effects and the background layer.

5. The method of claim 3, further comprising:
   displaying, via a display unit, the composite output.

6. The method of claim 3, further comprising:
   transmitting to a plurality of receiving devices, via an output unit, the composite output.

* * * * *